(No Model.)  2 Sheets—Sheet 1.

J. P. COBB.
BORING MACHINE.

No. 324,920.  Patented Aug. 25, 1885.

Witnesses,
Geo. H. Strong.
J. S. Rourke

Inventor,
John P. Cobb
By Dewey & Co.
Attorneys (No Model.) 2 Sheets—Sheet 2.

J. P. COBB.
BORING MACHINE.

No. 324,920. Patented Aug. 25, 1885.

Witnesses
Geo. H. Strong.
J. H. Soulze

Inventor,
John P. Cobb
By Dewey & Co.
Attorneys

UNITED STATES PATENT OFFICE.

JOHN PERRY COBB, OF COLLEGE CITY, CALIFORNIA.

BORING-MACHINE.

SPECIFICATION forming part of Letters Patent No. 324,920, dated August 25, 1885.

Application filed May 4, 1885. (No model.)

*To all whom it may concern:*

Be it known that I, JOHN P. COBB, of College City, Colusa county, State of California, have invented an Improvement in Drilling Apparatus; and I hereby declare the following to be a full, clear, and exact description of the same.

My invention relates to a drilling apparatus; and it consists of a rotating frame, around the periphery of which a number of shanks for drills of different sizes are journaled, a gearing or mechanism by which these drills are operated, and a means for bringing any drill into action and throwing the others out, together with a feed mechanism, all of which will be more fully explained by reference to the accompanying drawings, in which—

Figure 1:
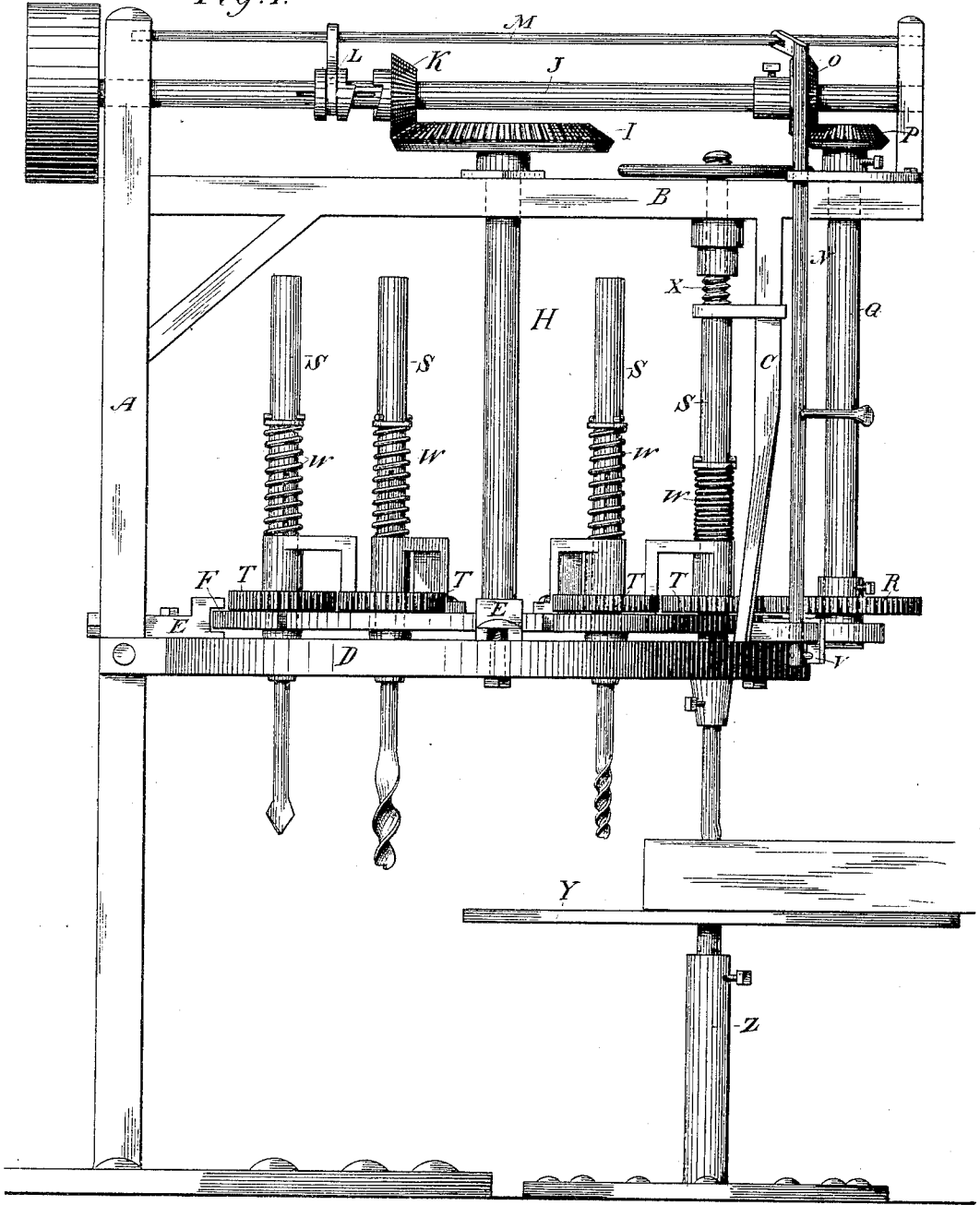
Figure 2:
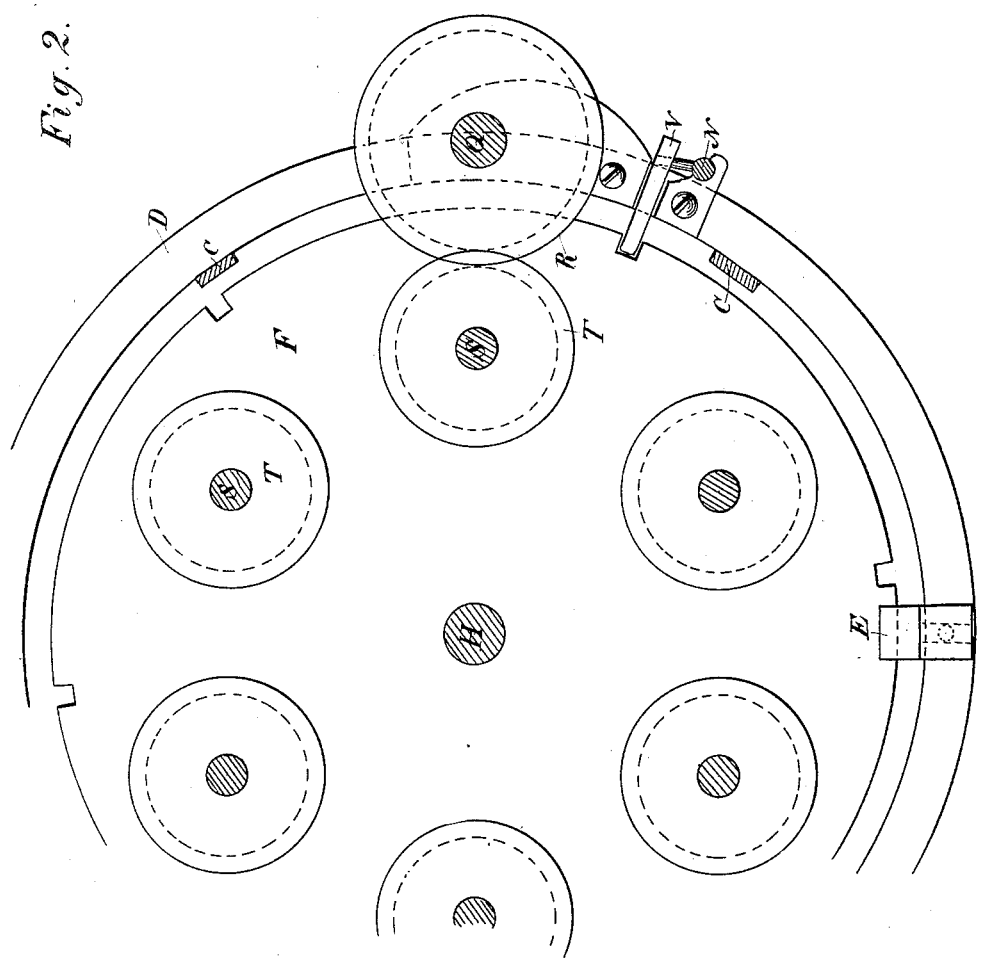

Figure 1 is a view of my apparatus, (side elevation.) Fig. 2 is a plan of disk and driving-gears.

A is a post or standard of sufficient strength, which is firmly secured to the floor where the apparatus is to be used. B is an arm near the top, extending to one side, properly braced, and having a pendent arm, C, between the lower end of which and the post A a ring, D, is supported. Upon this ring are guides E, within which the edges of a horizontal disk, F, are retained and guided. Through the center of this disk a shaft, H, passes upward through the transverse beam B at the top of the frame, and a beveled gear, I, is fixed to the top of this shaft, as shown. A horizontal shaft, J, is journaled in the frame above the beam B, and carries a loose pinion, K, which engages with the beveled gear-wheel I and a clutch device, L, which moves on a feather on the shaft J, and is operated so as to engage with the pinion and cause it to rotate the gear, the vertical shaft, and the disk at pleasure. This movement of throwing the clutch into and out of action is produced by a sliding rod, M, situated above the horizontal driving-shaft J, and having a fork which engages with the clutch, as shown. This rod is moved back and forward by a lever upon the upper end of a vertical rod, N, which extends down to the ring D, so as to be within reach of the operator.

Upon the outer end of the horizontal driving-shaft J, which extends above the beam B, as before described, is fixed a beveled pinion, O, and this engages a similar pinion, P, upon the upper end of a vertical shaft, Q, that is journaled in the outer end of the beam B, and in a suitable step upon the edge of the ring D. The lower end of this shaft carries a spur-gear, R, which is kept in constant rotation by means of the driving-shaft J, before described, and its gearing. Through the periphery of the disk are made holes, and vertical stems S project through these holes. The lower ends of these stems are fitted to receive the shanks of boring-tools, and there may be as many of them as are found necessary or desirable for the apparatus or the work to be done. Each of the vertical stems is slotted or fitted with a feather, so that it may move up and down through a gear-wheel, T, fixed to it just above the upper face of the disk, and at such a point as to be in line with the gear-wheel R at the lower end of the vertical shaft Q. Whenever the disk is turned so as to bring either of the drills to the front, it brings its gear-wheel T in position to engage with the driving-gear R upon the vertical shaft Q, and the drill will then be caused to rotate as long as it is kept in this position. By rotating the disk either of the drills may be brought to the front to be used, and no time will be lost. The disk is caused to rotate by means of its central shaft, the beveled gear I, and pinion K at the top end of the clutch mechanism before described. The edge of the disk has notches cut in it, and a pawl or stop, V, is actuated by the same vertical rod, N, which throws the clutch mechanism into or out of gear, so that as the clutch mechanism is thrown out of gear this stop is caused to engage with the notch which is at that moment brought opposite to the stop, and this holds the disk steady while the drill is in operation. Each of the drill-shanks has a spiral spring, W, which throws it up and disengages it from the work whenever it is released from the feeding-screw X, that operates in a line above the point where the drills stand when they are at work. This feed-screw is operated by a hand-wheel, in the usual way, and forces the rotating shaft and drill downward upon the work which is to be done. As soon as the feed-screw is run back the elasticity of the spring W raises the drill and shank, and holds it out of the way after it has been carried around by the rotation of the disk. Beneath this disk and the drills is a table, Y, which is adjustably supported by a standard or post, Z, so that it may be raised or lowered to suit the work to be done.

Having thus described my invention, what I claim as new, and desire to secure by Letters Patent, is—

1. In a drilling apparatus, a horizontal disk having drill-shanks journaled vertically around its periphery, a central shaft and gearing to which the disk is fixed, and by which it is caused to rotate, and a stationary exterior ring supported by the frame and located beneath the disk, and guides within which the periphery of the disk turns, substantially as herein described.

2. In a drilling apparatus, a horizontal rotating disk, and a stationary exterior ring located beneath the disk and provided with guides for the edges of said disk, and a central driving-shaft having a gear, I, in combination with a clutch mechanism consisting of the shaft J, the pinion K, an arm, L, a shaft, M, and an operating-lever, whereby the gear may be thrown into or out of engagement with the driving-pinion to rotate the table, and a stop adapted to engage notches upon the edges of the disk and hold it, substantially as described.

3. In a drilling apparatus, the combination of the following elements: a horizontal disk, a stationary ring located beneath the disk and supported by the main frame, the guides E upon the ring, vertical drill-shank journaled and moved through the periphery of the disk, gears fitted to said shank so as to allow the shanks to be moved vertically through them, springs by which the shanks and drills are raised, a stationary feeding screw and wheel, whereby each drill may be forced downward when brought in engagement with the driving-gear, substantially as herein described.

In witness whereof I have hereunto set my hand.

JOHN PERRY COBB.

Witnesses:
S. H. NOURSE,
H. C. LEE.